(12) United States Patent
Crowl

(10) Patent No.: US 6,522,741 B1
(45) Date of Patent: Feb. 18, 2003

(54) HYBRID NETWORK CALL DELIVERY ROUTING USING A SERVING SWITCHING ELEMENT POINT CODE AND TEMPORARY DESTINATION LOCATION NUMBER

(75) Inventor: Steven Michael Crowl, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 09/318,964

(22) Filed: May 26, 1999

(51) Int. Cl.[7] .............................. H04M 3/42; H04Q 7/20
(52) U.S. Cl. .............................. 379/207.11; 379/211.01; 379/201.02; 455/414; 455/433
(58) Field of Search ..................... 379/60, 59; 455/414, 455/433

(56) References Cited

U.S. PATENT DOCUMENTS

| | | | |
|---|---|---|---|
| 5,402,470 A | * | 3/1995 | DeVaney |
| 5,440,614 A | * | 8/1995 | Sonberg et al. |
| 6,181,935 B1 | * | 1/2001 | Gossman et al. |
| 6,317,594 B1 | * | 11/2001 | Gossman et al. |

* cited by examiner

Primary Examiner—Ahmad F. Matar
Assistant Examiner—Thjuan P Knowlin
(74) Attorney, Agent, or Firm—Harley R. Ball; Steven J. Funk; Kevin D. Robb

(57) ABSTRACT

According to the invention, a method and apparatus are disclosed for hybrid network call delivery routing using a serving switching element point code and temporary destination location number. Using a hybrid system as taught by the present invention, existing communications network can be migrated to advantageously use point code call routing. Moreover, the disclosed hybrid methodology does not require end-to-end use of point code routing. Rather, a provider's network can transition the heavily trafficked network elements to reduce overhead and costs, while less heavily used network elements can continue to use destination phone number routing or be changed to support point code routing when the cost of its migration is justified. The hybrid network of the present invention provides for call routing using a SS7 point code identifying the serving switching element for those elements which support point code routing, and temporary location destination number routing for those network elements which do not support point code routing. When a path to a destination mobile switching center requires multiple hops (i.e., traverses through multiple network elements), the trunk group parameters for the next hop indicate whether the next network element can route based on a point code. If point code routing is available, the call signaling message is routed based on the point code value. Otherwise, a temporary location destination number is requested and used.

9 Claims, 4 Drawing Sheets

HYBRID NETWORK CALL DELIVERY ROUTING USING A SERVING SWITCHING ELEMENT POINT CODE AND TEMPORARY DESTINATION LOCATION NUMBER

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to telecommunications networks, and more particularly, to hybrid network call delivery routing using a serving switching element point code and temporary destination location number.

2. Description of the Prior Art

As is the case for most businesses, telecommunications service providers desire to increase their profits. Typically, profits are increased by offering new products and services, and by reducing costs associated with providing an offered service. Communications service providers typically offer services on a very large scale, such as on a nationwide basis. In this environment, communications providers can substantially reduce costs by decreasing the number of messages sent between switching equipment when routing a call through the network. This cost reduction applies to all types of communications networks including the public switched telephone network (PSTN), cellular, and personal communications services (PCS) networks.

Communications elements communicate call signaling information using Signaling System #7 (SS7). A unique point code is assigned to each element in the signaling network. A point code is divided into a three-level hierarchy for efficient routing. In North America, the message transfer part level 3 point code consists of three 8-bit fields: Network ID, Cluster ID and Node ID. The SS7 message transfer part consists of three layers that together transfer messages across the signaling network. Message handling and network management is provided by message transfer part level 3. Messages received at level 3 are routed according to information in the routing label including the destination point code and originating point code. The destination point code specifies the network element which is to receive the particular message, and originating point code identifies the sender of the message.

Subscriber mobility is an important facet of personal communications services. PCS subscribers desire to be able to use their PCS and cellular phones wherever the subscriber travels. Location registration is the process of tracking mobile users. Databases called location registries assist in performing mobility management, and include a central home location registry and multiple visitor location registries. Current cellular standards and implementations use a two-tier hierarchy of databases to locate a PCS subscriber. Such techniques employ a central home location registry and multiple visitor location registries to maintain semi-permanent subscriber information; forwarding information is returned in response to location requests. In current implementations, when a new terminal (e.g., PCS phone or other device) is detected by a mobile switching center, it sends a registration notification message to its visitor location registry where the information (i.e., serving mobile switching center, terminal identification) is recorded and forwarded to the terminal's home location registry. If the terminal was registered at another visitor location registry, the home location registry sends a registration cancellation request to that visitor location registry where the previous entry is deleted. This cancellation request is forwarded to the previous mobile switching center.

Call delivery is the process of locating mobile users and completing calls to them. During call delivery, the home location registry must query the listed visitor location registry which in turn queries the serving mobile switching center to obtain a temporary local directory number (TLDN) for routing to the destination mobile switching center. TLDNs cannot be allocated at location registration time due to the scarcity of numbers. More specifically, in current implementations, the originating switch (e.g., mobile switching center) sends a location request directly to the called party's home location registry identified by the service provider of the called party's universal personal number. The home location registry determines the party's current visitor location registry based on a prior location registration sequence and sends a route request message to the visitor location registry. The route request message is forwarded to the visited mobile switching center. The mobile switching center allocates a temporary local directory number for the terminal and returns this through its visitor location registry to the home location registry where it is returned to the originating switch. The signaling traffic for such a scheme requires six signaling messages.

A method for improving the overhead associated with connecting a mobile call, including reducing the number of signaling messages required for routing the mobile call, is presented in Steven Michael Crowl, Non-Geographic User Locator Strategy for Personal Communication Service, A Dissertation in Computer Networking and Networking and Telecommunications, University of Missouri-Kansas City, Mar. 31, 1997 (hereafter "Crowl 1997"), and is hereby incorporated by reference. As the basis for routing mobile calls, Crowl 1997 proposes replacing the current use of a TLDN with a Signaling System #7 (SS7) point code identifying the serving network element. Using point code routing for call delivery, the call delivery process begins when a terminal sends a call request to its serving switch; the universal personal number of the destination terminal is included in the request. A database query is made to request the point code of the serving switch. The home location registry returns the point code of the mobile switching center serving the destination. The second part of the call delivery process routes the call to the destination mobile switching center based on the point code in the response. The point code of the called mobile switching center will be carried as a mandatory parameter in the initial address message (IAM). Intermediate switches will use this point code as a key to their routing tables to select the next switch in the path. As currently implemented in the network, the called party number is carried in the initial address message as a mandatory parameter for identifying the terminal at the destination switch. Such a methodology reduces the number of signaling messages required for call delivery from six to two. This message reduction increases signaling network capacity by two hundred percent, and reduces the transaction load on switching elements, drastically reducing unit cost.

However, the system contemplated and taught by Crowl 1997 requires each routing switch in the network to operate using point code routing, which is not feasible for existing communications networks. The cost to change each network element to use point code routing is substantial, and simultaneous cutting over of all network elements to use point code routing is unmanageable. In this regards, Crowl 1997 does not provide a cohesive strategy for deploying this technology in existing networks.

SUMMARY OF THE INVENTION

According to the invention, a method and apparatus are disclosed for hybrid network call delivery routing using a serving switching element point code and temporary destination location number. Moreover, the present invention expands the use of point code routing as contemplated by Crowl 1997 to include call routing for offering line number portability within the public switched telephone network.

Using a hybrid system as taught by the present invention, existing communications network can be migrated to advantageously use point code call routing. Moreover, the disclosed hybrid methodology does not require end-to-end use of point code routing. Rather, a provider's network can transition the heavily trafficked network elements to reduce overhead and costs, while less heavily used network elements can continue to use destination phone number routing or be changed to support point code routing when the cost of its migration is justified.

The hybrid network of the present invention provides for call routing using a SS7 point code identifying the serving switching element for those elements that support point code routing, and TLDN routing for those network elements that do not support point code routing. When a path to a destination mobile switching center requires multiple hops (i.e., traverses through multiple network elements), the trunk group parameters for the next hop indicate whether the next network element can route based on a point code. If point code routing is available, the call signaling message is routed based on the point code value. Otherwise, a TLDN is requested and used. Because the current switch has the point code of the serving mobile switching center and the universal personal number (supplied in the initial address message) of the destination telephonic device, the switch can send a location request directly to the serving mobile switching center using this point code. The serving mobile switching center then allocates the TLDN as done by current systems, and returns the TLDN to the requesting switch. In an embodiment, the routing of the call then proceeds through the call completion using the TLDN, in which case the initial address message will be forwarded with the TLDN and without the serving point code parameter. In another embodiment, the initial address message will be forwarded with the TLDN and the serving point code parameter so that either the TLDN or the serving point code parameter can be used in routing the call through the rest of the network. In an embodiment, if the originating switch does not support point code routing (or selectively chooses not to use point code routing), the call can be routed first using a TLDN, with other network elements routing the call using point code routing. The present invention further provides that the type of call routing used can change between point code and TLDN routing at any network element.

An embodiment of the present invention includes a method for operating a communications network to provide call routing based on a serving network element point code and a temporary location directory number (TLDN) from a first switching element to a third switching element, the method comprising the steps of: the first switching element, supporting point code routing, receiving a call routing request having the serving network element point code; the first switching element routing the call based on the serving network element point code to a second switching element supporting point code routing; and the second switching element routing the call based on the TLDN to a third switching element not supporting point code routing. Preferably, the method further comprises the first switching element querying a database server to receive the serving network element point code. Preferably, the method further comprises the second switching element querying a serving switching element to receive the TLDN. Preferably, the method further comprises the second switching element querying a database server to receive the TLDN. Preferably, the call is a mobile wireless call. Preferably, the call is associated with a line number portability service.

An embodiment of the present invention includes a method for operating a communications network to provide call routing based on a serving network element point code and a temporary location directory number (TLDN) from a first switching element to a third switching element, the method comprising the steps of: the first switching element, supporting point code routing, receiving a call routing request having the serving network element point code; the first switching element routing the call based on the serving network element point code to a second switching element supporting point code routing; the second switching element routing the call based on the TLDN to a third switching element not supporting point code routing; the third switching element routing the call based on the TLDN to a fourth switching element supporting point code routing; and the fourth switching element routing the call based on the serving network element point code to a fifth switching element supporting point code routing. Preferably, the method further comprises the first switching element querying a database server to receive the serving network element point code. Preferably, the method further comprises the second switching element querying a serving switching element to receive the TLDN. Preferably, the method further comprises the second switching element querying a database server to receive the TLDN. Preferably, the call is a mobile wireless call. Preferably, the call is associated with a line number portability service.

An embodiment of the present invention provides for a method for operating a communications network to provide call routing based on a serving network element point code and a temporary location directory number (TLDN), the method comprising the steps of: a first network element supporting point code routing receiving a phone number of a called communications device; the first switching element querying a routing database using the phone number and receiving reply containing a serving network element point code; the first network element routing the call based on the received serving network element point code to a second network element supporting point code routing; the second network element querying a network element and receiving the TLDN; and the second network element routing the call based on the received directory number to a third network element. Preferably, the third network element is the serving network element.

An embodiment of the present invention provides for a hybrid communications network containing call switching elements, the hybrid communications network comprising: a first switching element for receiving a call having an associated serving network element point code and routing the received call based on the serving network element point code; a second switching element connected to the first switching element for receiving and routing calls based on either temporary location directory number (TLDN) or the serving network element point code; and a non-point code routing switching element connected to the second switching element for routing calls received from the second switching element based on the TLDN. Preferably, the connection between the first and second switching elements includes at least one switching element. Preferably, the connection between the second and non-point code routing switching elements includes at least one switching element. Preferably, the hybrid communications network of claim 15, further comprises a database server containing a set of point codes, wherein the first switching element queries the database server to receive the serving network element point code.

BRIEF DESCRIPTION OF THE DRAWINGS

The appended claims set forth the features of the present invention with articularity. The invention, together with its advantages, may be best understood from the following detailed description taken in conjunction with the accompanying drawings of which:

DETAILED DESCRIPTION OF THE PREFERRED EMBODIMENT

Figure 1:
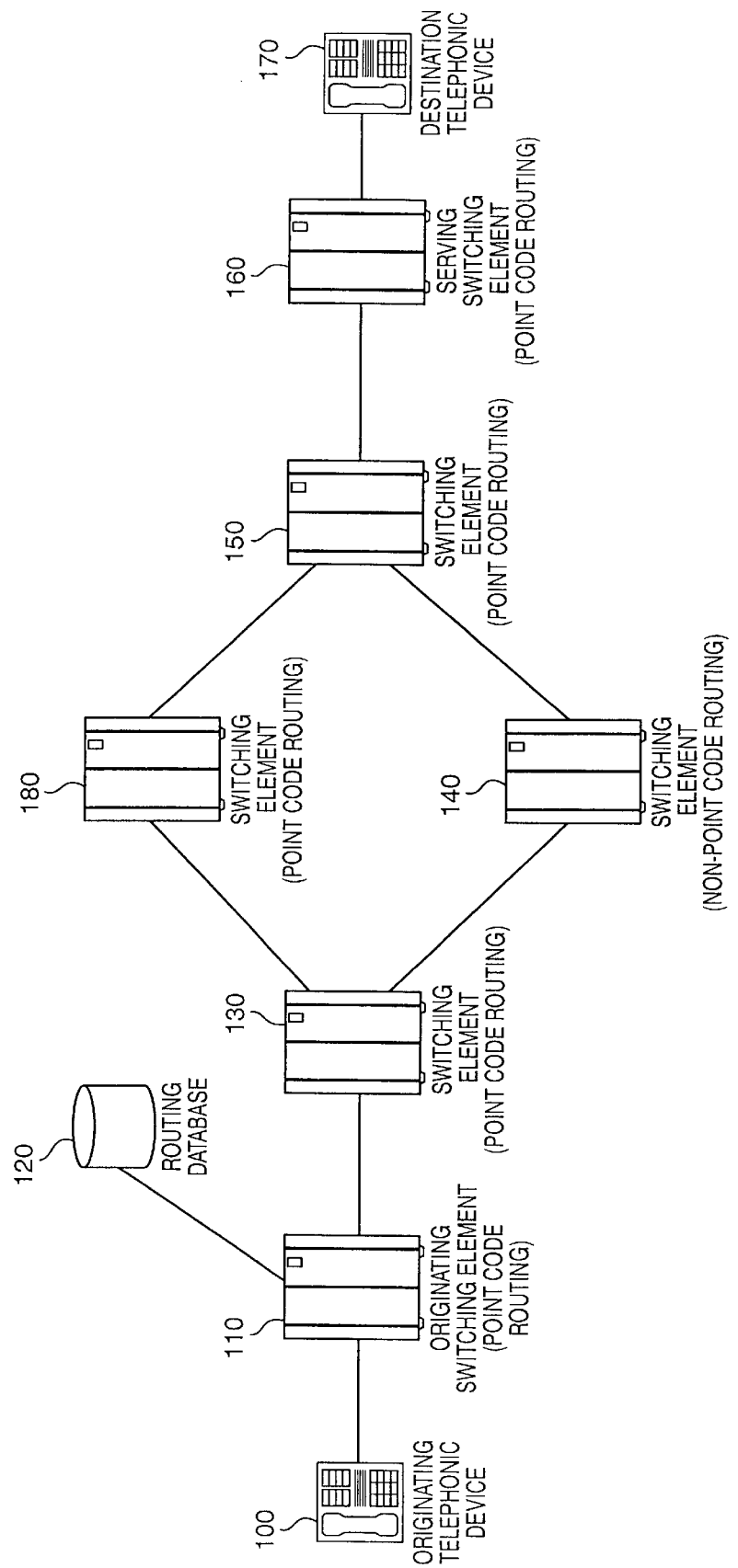
FIG. 1 is a block diagram of an exemplary network environment in which the present invention may be practiced.

FIG. 1 and its discussion herein are intended to provide a description of a general communications environment in which the present invention can be practiced. The present invention is not limited to a single communications environment. Moreover, the architecture and functionality of the present invention as taught herein and would be understood by one skilled in the art is extensible to an unlimited number of communications environments and embodiments in keeping with the scope and spirit of the present invention.

Turning first to FIG. 1, an exemplary operating environment is illustrated in which the present invention may be practiced. The present invention provides for hybrid network call delivery routing using a point code and temporary location destination number (TLDN) of a servicing network element. This exemplary network comprises two telephonic devices 100, 170 (e.g., cellular, PCS, or wireless telephones, facsimile machines, and computers, etc.), and six networked switching elements 110, 130–160, 180. As illustrated in this configuration, switching elements 110, 130, 150, 160, 180 support point code routing, while switching element 140 does not support point code routing. Originating switching element 110 is connected to and queries a routing database 120 to receive the point code of the serving network element (i.e., serving switching element 150 for the configuration illustrated in FIG. 1). Thus, a communications call from telephonic device 100 to telephonic device 170 is completely routed based on the received point code of serving switching element 160 if the call traverses switching elements 110, 130, 180, 150, 160. However, if the call traverses switching elements 110, 130, 140, 150, 160, then hybrid network call delivery routing is used according to the present invention. In the latter hybrid routing case, the call will be routed from switching element 110 to switching element 130 using the point code of switching element 160 (i.e., the point code of the serving network element). Switching element 130 then queries switching element 160 for a TLDN. The call is then routed from switching element 130 through switching elements 140, 150 to switching element 160 using TLDN routing. In another embodiment, switching elements can revert to point code routing for a remaining portion of the call routing, as will be described hereinafter in relation to FIG. 2B.

In the wireless arena, the network illustrated of FIG. 1 represents a PCS or cellular network. In this case, telephonic devices 100, 170 represent PCS or cellular telephones or other devices, which switching elements 110, 160 being mobile switching centers and base stations, and the routing database 120 representing the visitor and home location registries with switching elements 160 (mobile switching center) also connected. Then, switching elements 130–150, 180 represent the interconnected PCS or cellular network connecting switching elements 110, 160. In a similar fashion, the network illustrated in FIG. 1 represents an intelligent network for providing line number portability service as would be understood by one skilled in the art.

Figure 2A:
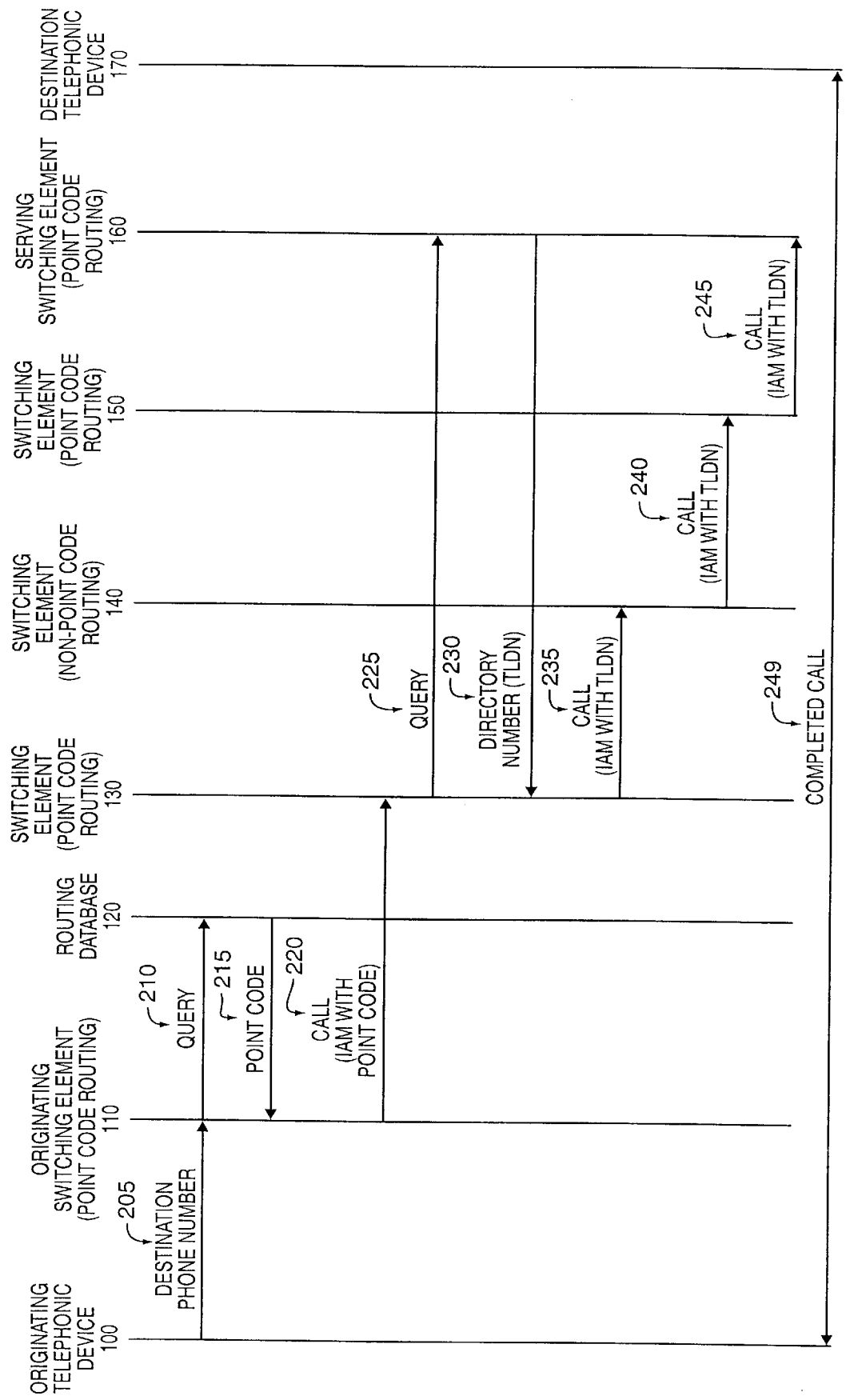
FIGS. 2A–2B are message sequence charts for embodiments of the present invention.
Figure 2B:
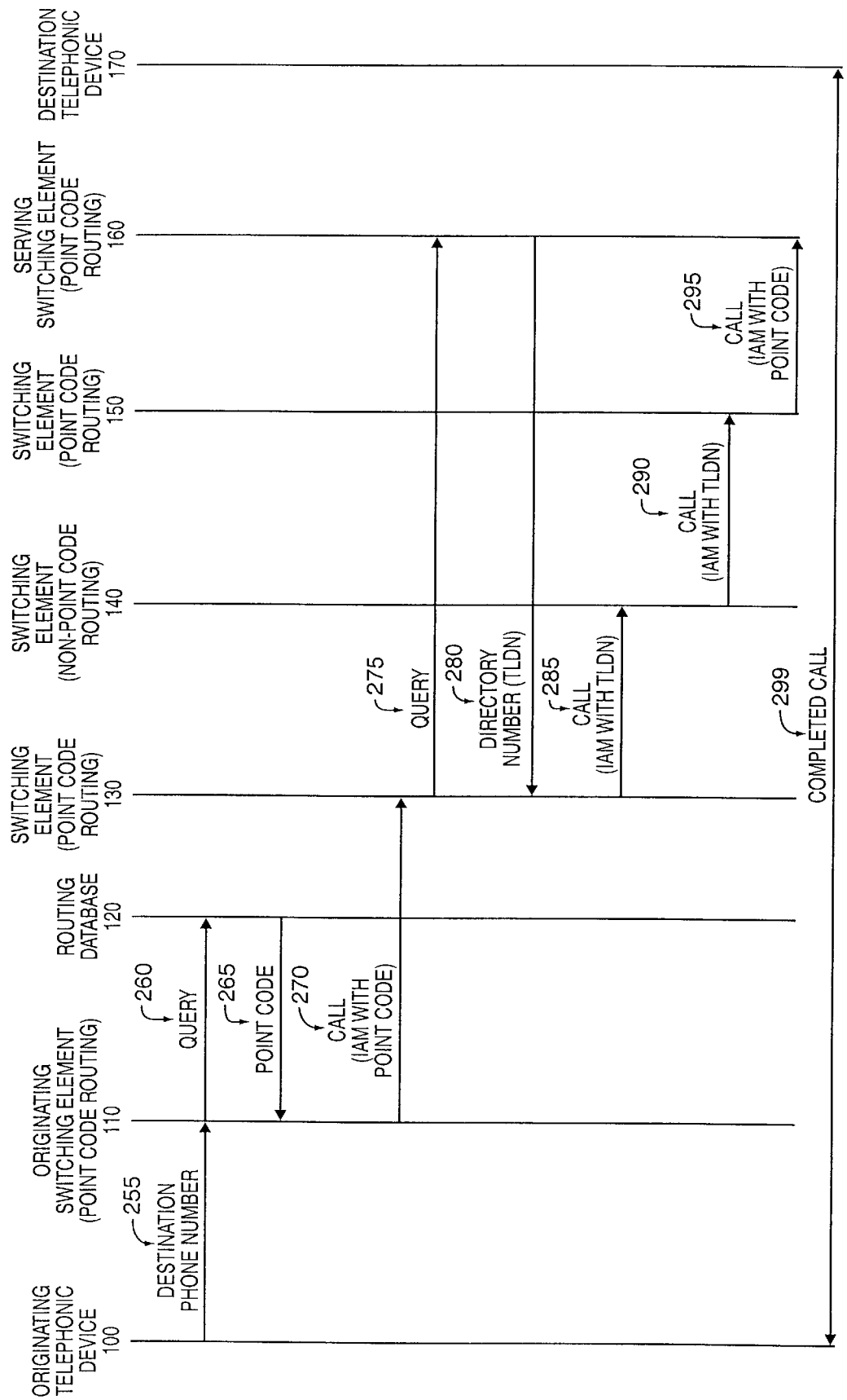

Turning now to FIGS. 2A–2B, illustrated are message sequence charts illustrating the flow of signaling messages in embodiments of the present invention. Message sequence charts are a well-known format for depicting communication between elements. An embodiment of the present invention based on the exemplary network topology illustrated in FIG. 1 is further described with reference to the message sequence chart illustrated in FIG. 2A, to which we now turn.

Originating telephonic device 100 initiates a communications call by providing the phone number of the called party (i.e., destination phone number 205) to the originating switching element 110. Switching element 110 then queries (210) routing database 120 for the point code of the serving switching element (i.e. serving switching element 160) for the received destination phone number. The serving switching element point code (215) is returned to switching element 110 for use in routing the communications call. Next, switching element 110 routes the call by providing an Initial Address Message (IAM) with the destination point code (220) to the switching element 130. Switching element 130 then selects the next switching element (and trunk facility) to route the call over. In the present scenario, switching element 140 is selected, and switching element 130 determines that third switching element 140 does not support point code routing. Therefore, switching element 130 makes a query (225) to serving switching element 160. Serving switching element 160 returns a temporary local directory number (TLDN) (230) to switching element 130 to use for routing the call the remainder of the way to serving switching element 160. Next, switching element 130 routes the call by providing an Initial Address Message (IAM) with the TLDN (235) to the switching element 140. Then, switching element 140 routes the IAM with the TLDN (240) to switching element 150. Then, switching element 150 routes the IAM with the TLDN (245) to serving switching element 160. As the call has reached the serving switching element, the call is completed (249) between the originating telephonic device 100 and the destination telephonic device 170.

Another embodiment of the present invention based on the exemplary network topology illustrated in FIG. 1 is further described with reference to the message sequence chart illustrated in FIG. 2B, to which we now turn. The difference in routing illustrated in FIGS. 2A and 2B is that in FIG. 2B, switching element 150 reverts to routing the call using the point code of the serving switching element with message 295.

As illustrated in FIG. 2B, originating telephonic device 100 initiates a communications call by providing the phone number of the called party (i.e., destination phone number 255) to the originating switching element 110. Switching element 110 then queries (260) routing database 120 for the point code of the serving switching element (i.e. serving switching element 160) using the received destination phone number for the called party. The serving switching element point code (265) is returned to switching element 110 for use in routing the communications call. Next, switching element 110 routes the call by providing an Initial Address Message (IAM) with the destination point code (270) to the switching element 130. Switching element 130 then selects the next switching element (and trunk facility) to route the call over. In the present scenario, switching element 140 is selected, and switching element 130 determines that third switching element 140 does not support point code routing. Therefore, switching element 130 makes a query (275) to serving switching element 160. Serving switching element 160 returns a temporary local directory number (TLDN) (280) to switching element 130 for use in routing the call the remainder of the way to serving switching element 160. Next, switching element 130 routes the call by providing an Initial Address Message (IAM) with the TLDN (285) to the switching element 140. Then, switching element 140 routes the IAM with the TLDN (290) to serving switching element 160. As both switching elements 150 and 160 both support point code routing, switching element 150 routes the IAM with the serving switching element point code (295) to serving switching element 160. As the call has reached the serving switching element, the call is completed (299) between the originating telephonic device 100 and the destination telephonic device 170.

Figure 3:
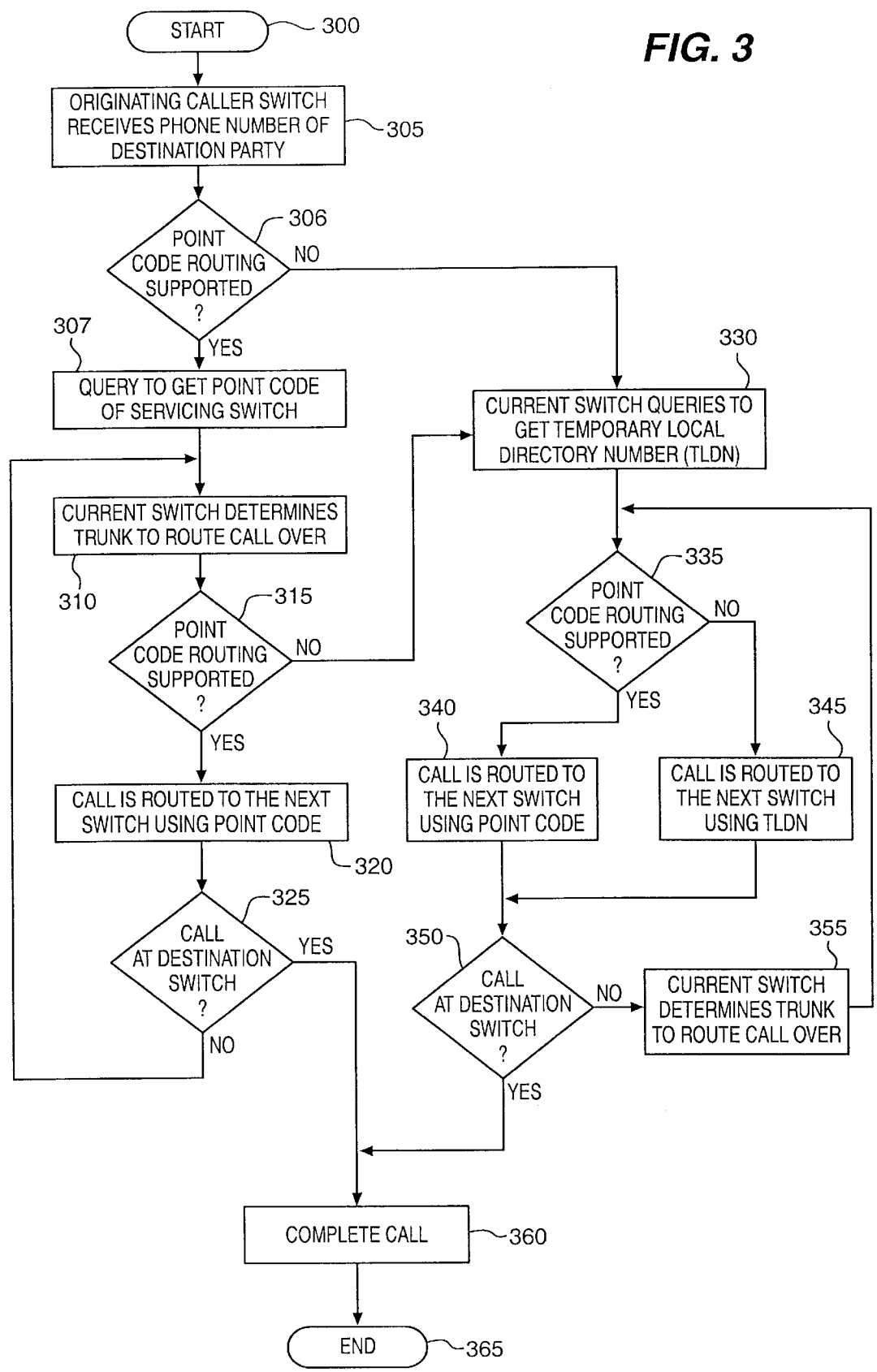
FIG. 3 is a flow diagram of the call routing processing by a switching element in accordance with the present invention.

Turning now to FIG. 3, illustrated are the steps performed by an embodiment of a switching element in hybrid routing of a call according to the present invention. Processing begins at step 300, and proceeds to step 305 where the originating caller switching element receives the phone number of the destination party. If the originating switching element does not support point code routing (as determined in step 306), then step 330 and subsequent processing is performed as described hereinafter to complete the routing of the call using traditional temporary local directory number (TLDN) routing. Otherwise, point code routing is supported by the originating switching element, and a query to a database or to another network element is performed in step 307 to get the point code of the serving switching element. Next, in step 310, the current switch (i.e. the originating caller switching element in the first time through the processing loop) determines the next trunk and switching element to which to route the call. Then, in step 315, the current switching element determines whether point code routing is supported by the next switching element to which the call is being routed. If point code routing is supported, the call is routed to the next switch in step 320. If the call has reached the destination switching element as determined in step 325, the call is completed between the originating and destination telephonic devices in step 360. Otherwise, the routing process continues and processing loops back to step 310.

If, however, at step 315, the current switching element determines that the next switching element to which the call is to be routed does not support point code routing, then steps 330–360 are performed to complete the routing of the call using traditional temporary local directory number (TLDN) routing. In step 330, the current switching element queries the serving switching element (or possibly a routing database) to receive the TLDN to use for routing the call. In an embodiment, this TLDN will be used for routing the call the remainder of the way through the network to the serving network element. In this case, steps 335 and 340 would be ignored and the call would always be routed in step 345 using the TLDN.

In the embodiment where the network can revert to routing based on the point code of the serving network element, step 335 is performed to determine if point code routing is currently supported. If so, the call can be routed to the next switch using the point code in step 340; otherwise, the TLDN is used in step 345 to route the call to the next switch. If, as determined in step 350, the call has not reached the serving switch, then the current switching element determines the next trunk and switching element over which to route the call in step 355, and processing returns to step 335. When the call has been routed to the destination switching element as determined in step 350, the call is connected between the originating and destination telephonic devices in step 360, and call routing processing is competed for the current call as indicated by step 365.

In view of the many possible embodiments to which the principles of our invention may be applied, it will be appreciated that the embodiment described herein with respect to the drawing figures is only illustrative and should not be taken as limiting the scope of the invention. As would be understood by one skilled in the art, the present invention is not limited to the network configuration, message sequence charts, and flow diagrams present herein. To the contrary, the invention as described herein contemplates all such embodiments as may come within the scope of the following claims and equivalents thereof.

I claim:

1. A method for operating a communication system to handle a call, the method comprising:

in a first switching element, processing a destination telephone number for the call to determine a Signaling System 7 (SS7) point code for a destination switching element;

in the first switching element, processing the SS7 point code for the destination switching element to determine a second switching element on a call route to the destination switching element;

in the first switching element, determining if the second switching element supports point code routing;

in the first switching element and if the second switching element supports point code routing, transferring a first message to the second switching element indicating the SS7 point code for the destination switching element for use by the second switching element in routing the call; and in the first switching element and if the second switching element does not support point code routing, transferring a second message to the destination switching element using the SS7 point code for the destination switching element to obtain a temporary routing number for the destination switching element and transferring a third message to the second switching element indicating the temporary routing number for the destination switching element for use by the second switching element in routing the call.

2. The method of claim 1 wherein processing the destination telephone number to determine the SS7 point code for the destination switching element comprises:

in the first switching element, processing the destination telephone number to transfer a query;

in a routing database, processing the query to transfer a response indicating the SS7 point code for the destination switching element; and in the first switching element, processing the response to determine the SS7 point code for the destination switching element.

3. The method of claim 2 wherein the routing database comprises a home location register.

4. The method of claim 1 wherein the first switching element comprises a mobile switching center.

5. The method of claim 1 wherein the destination telephone number is for a wireless telephone.

6. A communication system to handle a call comprising:

a first switching element configured to process a destination telephone number for the call to transfer a query, process a response to determine a Signaling System 7 (SS7) point code for a destination switching element, process the SS7 point code for the destination switching element to determine a second switching element on a call route to the destination switching element, determine if the second switching element supports point code routing, and if the second switching element supports point code routing then to transfer a first message to the second switching element indicating the SS7 point code for the destination switching element for use by the second switching element in routing the call, but if the second switching element does not support point code routing then to transfer a second message to the destination switching element using the SS7 point code for the destination switching element to obtain a temporary routing number for the destination switching element and transfer a third message to the second switching element indicating the temporary routing number for the destination switching element for use by the second switching element in routing the call; and a routing database configured to process the query to transfer the response indicating the SS7 point code for the destination switching element.

7. The communication system of claim 6 wherein the routing database comprises a home location register.

8. The communication system of claim 6 wherein the first switching element comprises a mobile switching center.

9. The communication system of claim 6 wherein the destination telephone number is for a wireless telephone.

* * * * *